United States Patent [19]
Kulig

[11] 3,815,248
[45] June 11, 1974

[54] APPARATUS FOR PROCESSING CONTAINERS
[75] Inventor: Constantine W. Kulig, Windsor, Conn.
[73] Assignee: Emhardt Corporation, Bloomfield, Conn.
[22] Filed: Mar. 1, 1972
[21] Appl. No.: 230,583

[52] U.S. Cl................ 33/174 L, 73/45, 209/75, 209/82, 209/88 R
[51] Int. Cl......... B07c 5/06, B07c 1/10, B07c 5/08
[58] Field of Search........ 209/75, 82, 83, 88; 73/45, 73/45.1, 45.2, 41.3, 41.4, 45.3; 33/174 L

[56] References Cited
UNITED STATES PATENTS

| | | | |
|---|---|---|---|
| 3,010,310 | 11/1961 | Rowe | 73/45 |
| 3,247,964 | 4/1966 | Doud et al. | 209/82 UX |
| 3,273,710 | 9/1966 | Early et al. | 209/88 R |
| 3,279,599 | 10/1966 | Drennan | 209/75 X |
| 3,407,931 | 10/1968 | Vincent | 209/75 |
| 3,684,089 | 8/1972 | McMeekan | 209/82 |

Primary Examiner—John W. Huckert
Assistant Examiner—Milton S. Gerstein
Attorney, Agent, or Firm—McCormick, Paulding & Huber

[57] ABSTRACT
An apparatus for processing containers such as glass bottles and the like includes a plurality of dimensional gauges which are swept in a tracking motion with a container moving at a constant speed on a conveyor while the several gauging operations are performed. The gauges are mounted on four-bar linkages which have orbital links swept in adjacent relationship with the conveyor so that the gauges move at substantially the same speed as the articles along a tracking segment of the conveyor where the gauging operations are performed. A plug or choke gauge carried on one of the orbital members is reciprocated in and out of a moving container by a separate drive mechanism at a speed modulated to provide low impact velocities and rapid reciprocation of the gauge in and out of the container during the portion of the orbital movement wherein the gauges accurately track the article. A finish-height gauge is carried coaxially about the plug gauge and is reciprocated at a modulated speed different from that of the plug gauge so that the impact velocities on the container can be separately optimized for each of the gauges. The apparatus also includes a set of gauging rings which are orbited at a modulated speed along the tracking segment of the conveyor to check the body dimensions of the containers. The combination of the three gauges in a single inspection machine permits the important dimensions of a container, such as a glass bottle, to be inspected simultaneously along a single segment of a conveyor on which the containers are transported prior to filling or other operations.

29 Claims, 8 Drawing Figures

APPARATUS FOR PROCESSING CONTAINERS

CROSS REFERENCES TO RELATED APPLICATIONS

The following specification discloses subject matter which is related to or disclosed in part in a copending application entitled "Drive For A Container Processing Machine," Ser. No. 164,989 filed July 22, 1971 by the same inventor and having the same assignee.

BACKGROUND OF THE INVENTION

The present invention relates to container processing apparatus and more particularly to an inspection machine for checking the dimensions of newly formed containers, such as glass bottles, prior to filling or other operations which require that the containers be dimensionally uniform within specified tolerances.

Containers, such as glass beverage bottles, are presently being handled at higher speeds in filling lines where discharging heads or tubes of the filling machines must register accurately with the opening or finish of the bottle for a brief period of time so that a fluid can be rapidly discharged into it. The containers may then proceed through a capping machine which also requires a cooperative engagement between the container and an operative member of the capping machine.

In the filling, capping and similar operations in which the finish of the bottle is brought into engagement with a machine member, it is important that all of the bottles be dimensionally uniform within specified tolerances so that the operation is carried out rapidly and without difficulty. If, for example, a filling tube does not register precisely with the fill opening at the top of a container, the container may break and, in the case of glass containers, the adjacent containers may be so contaminated by flying glass, that their removal from the production run will be required. In addition, a broken container can jam a filling machine and cause damage to the machine as well as the as the adjacent containers. Shutting down an entire filling line in order to repair damaged parts and clean up the machine results in a significant loss in production time.

Because of the problems and confusion caused by a malformed bottle in a filling or similar glassware processing machine, it is desirable to check new bottles for dimensional accuracy before they are fed into a machine. Normally glassware forming machines produce uniformly shaped and dimensioned bottles without difficulty; however, if the manufacturing process is not accurately controlled, a number of dimensional inaccuracies can show up. For example, the bodies of a glass bottle can distort and become oversized so that they do not fit into a cup or pocket for holding the bottles erect as they are fed through a filling machine. The fill opening in the finish may be restricted and prevent the filling fluid from passing into the bottle at the desired fill rate. The bottle may also be too high to fit into the filling machine or the top of the bottle may lean so that it is not concentric with the bottom and, therefore, will not register with a filling tube. Finally, the container can also acquire a bent or "banana" configuration which interferes with the filling operations and can cause breakage to the filling tubes.

Inspecting bottles for dimensional accuracy is preferably carried out while the bottles are moving serially along a conveyor since such inspection provides a minimum of interference with the bottles and permits the inspection operation to be incorporated in processing plants with a minimum of disturbance to and relocation of existing conveyor systems. Such conveyors often move at high speed, and, therefore, the time interval in which the inspection operation or operations are carried out is limited. A plug or choke gauge, for example, must be inserted into a bottle a preselected distance in order to insure that the fill opening at the top of the bottle is not too small. If a plug gauge is reciprocated in and out of the bottle as the bottle is tracked at high speed along a segment of the conveyor, very high impact velocities can cause significant damage to the inspecting machine and the adjacent bottles if an undersized fill opening is encountered. Also, a number of dimensional checks are required before a bottle or other container is proven to be dimensionally acceptable for a filling machine or the like, and it is desirable that the inspecting machine carry out all of the dimensional checks simultaneously along a single segment of a conveyor carrying the containers.

It is accordingly a general object of the present invention to provide apparatus for efficiently inspecting the important dimensions of a container while the container is moved at a constant speed along a conveyor.

SUMMARY OF THE INVENTION

The present invention resides in an apparatus that is capable of tracking an article moving at a constant or uniform speed along a conveyor and simultaneously probing a device such as an inspection gauge toward and away from the article as it is being tracked. The apparatus includes generally a frame having an upright operating position permitting the apparatus to be located adjacent the conveyor on which the articles move at the constant speed. Carrier means is mounted on the frame and is movable relative to the frame in a first coordinate direction which lies parallel to the direction of movement of articles on the conveyor.

A probe assembly having a probe is mounted to the carrier means for movement of the probe along the probe axis relative to the carrier means. The probe axis is aligned perpendicular to the first coordinate direction so that the probe may be reciprocated relative to the carrier means toward and away from the articles on the conveyor and may reciprocate with the carrier means back and forth along a segment of the conveyor.

First drive means is connected to the carrier means and includes a first variable ratio gear set for cyclically moving the carrier means and the probe assembly back and forth along the segment of the conveyor at a speed modulated by the gear set to provide, for example, accurate tracking of an article at uniform speed and a fast return stroke. Second drive means is connected to the probe and includes a second variable ratio gear set for cyclically reciprocating the probe in the second coordinate direction toward and away from an article at a speed modulated to provide, for example, rapid reciprocation of the probe in and out of the fill opening in the article moving at a constant speed on the conveyor. By providing independent driving means for the probe, it is possible to separately modulate the tracking and stroking speeds of the probe for optimum performance. The apparatus is also provided with a finish-height gauge that can be utilized simultaneously with a plug gauge on the probe during the tracking operation. A body gauge can also be combined in the apparatus so that all of the important dimensions of an article, such as a glass bottle, can be inspected at the same time and along a single segment of a conveyor carrying the articles.

BRIEF DESCRIPTION OF THE DRAWINGS

FIG. 8 is a top plan view of the body gauge shown in the side elevation view of FIG. 2.

DESCRIPTION OF THE PREFERRED EMBODIMENT

Figure 1:
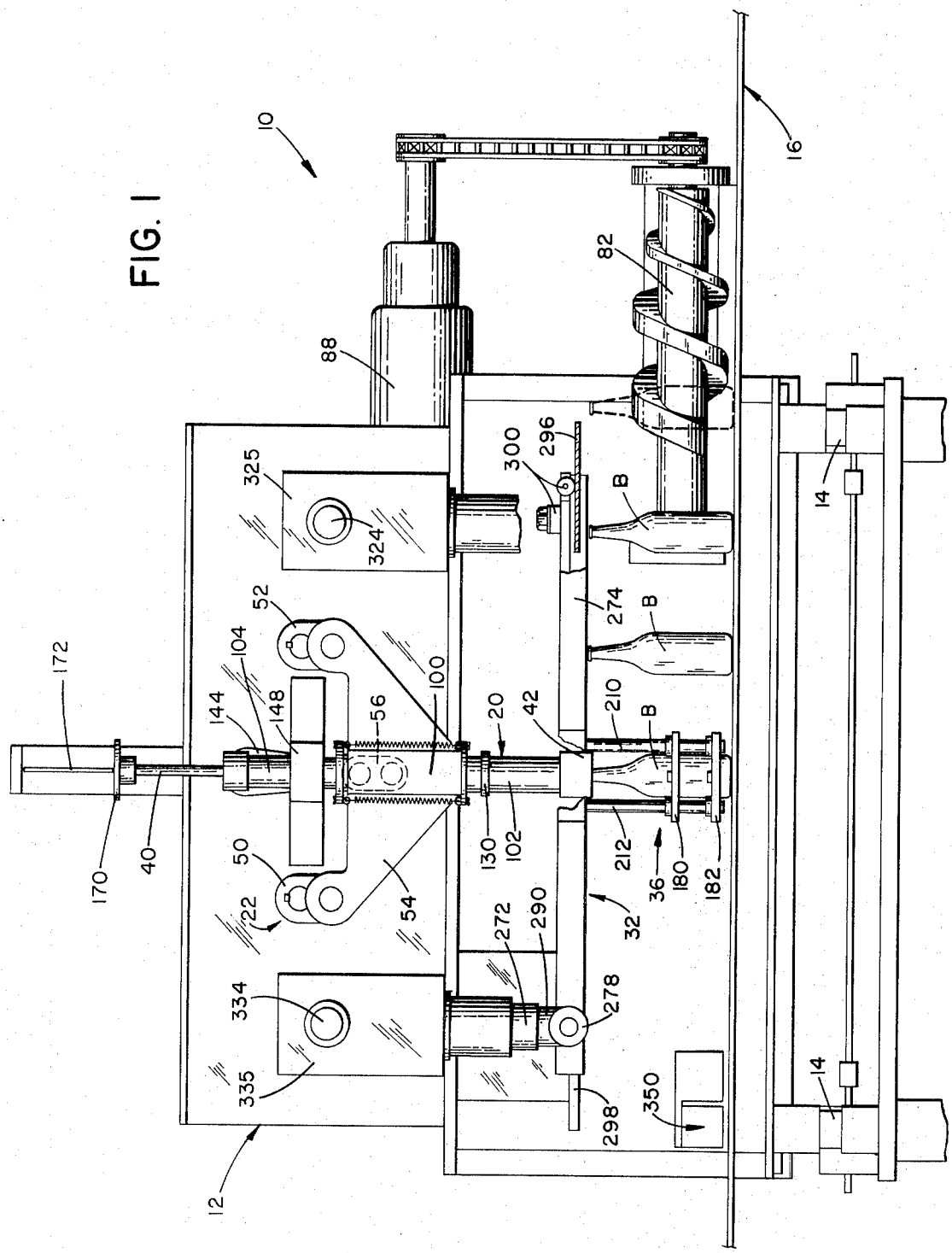
FIG. 1 is a front elevation view showing one embodiment of the apparatus of the present invention.
Figure 2:
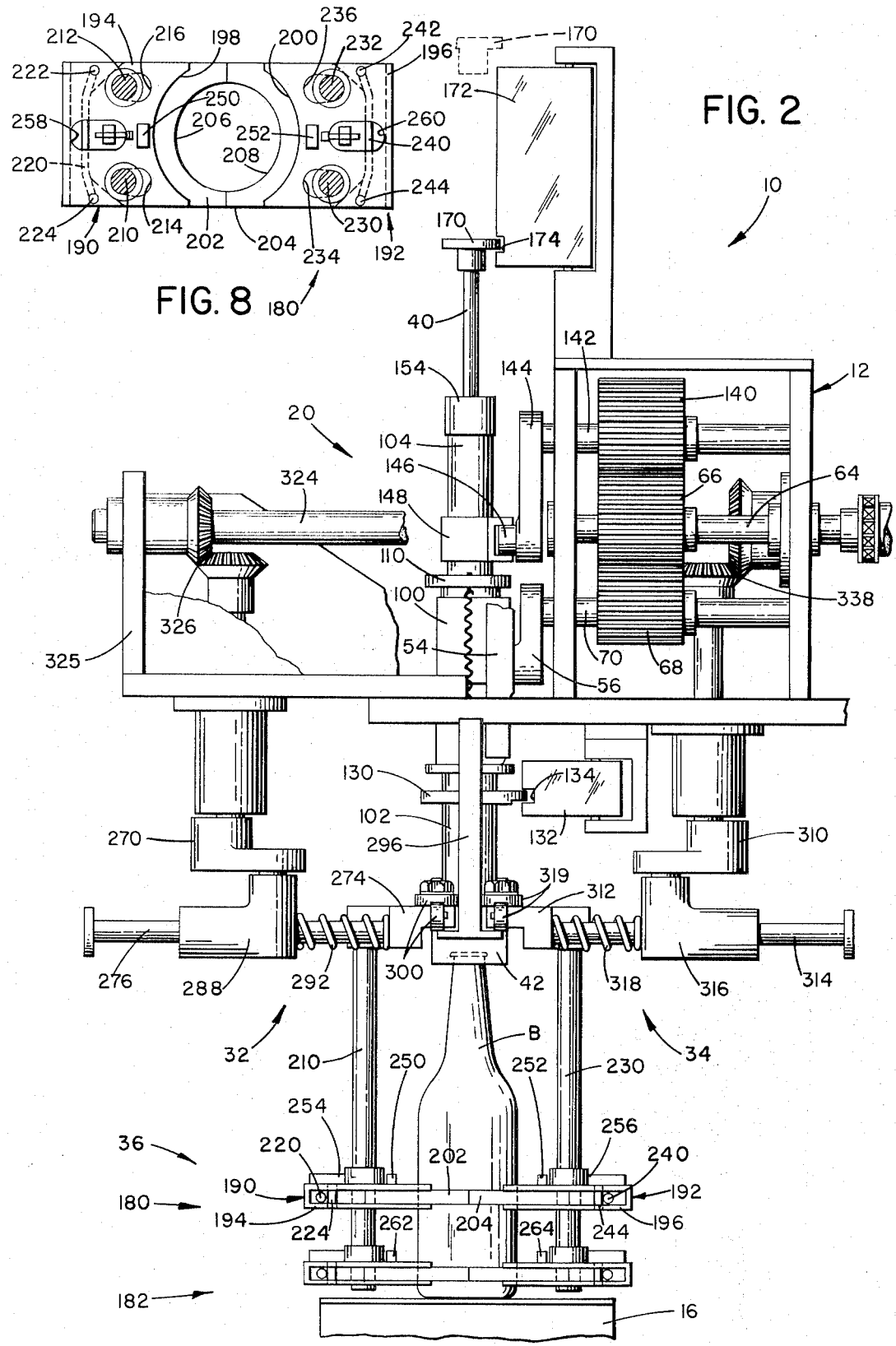
FIG. 2 is a side elevation view of the embodiment of the apparatus shown in FIG. 1.
Figure 3:
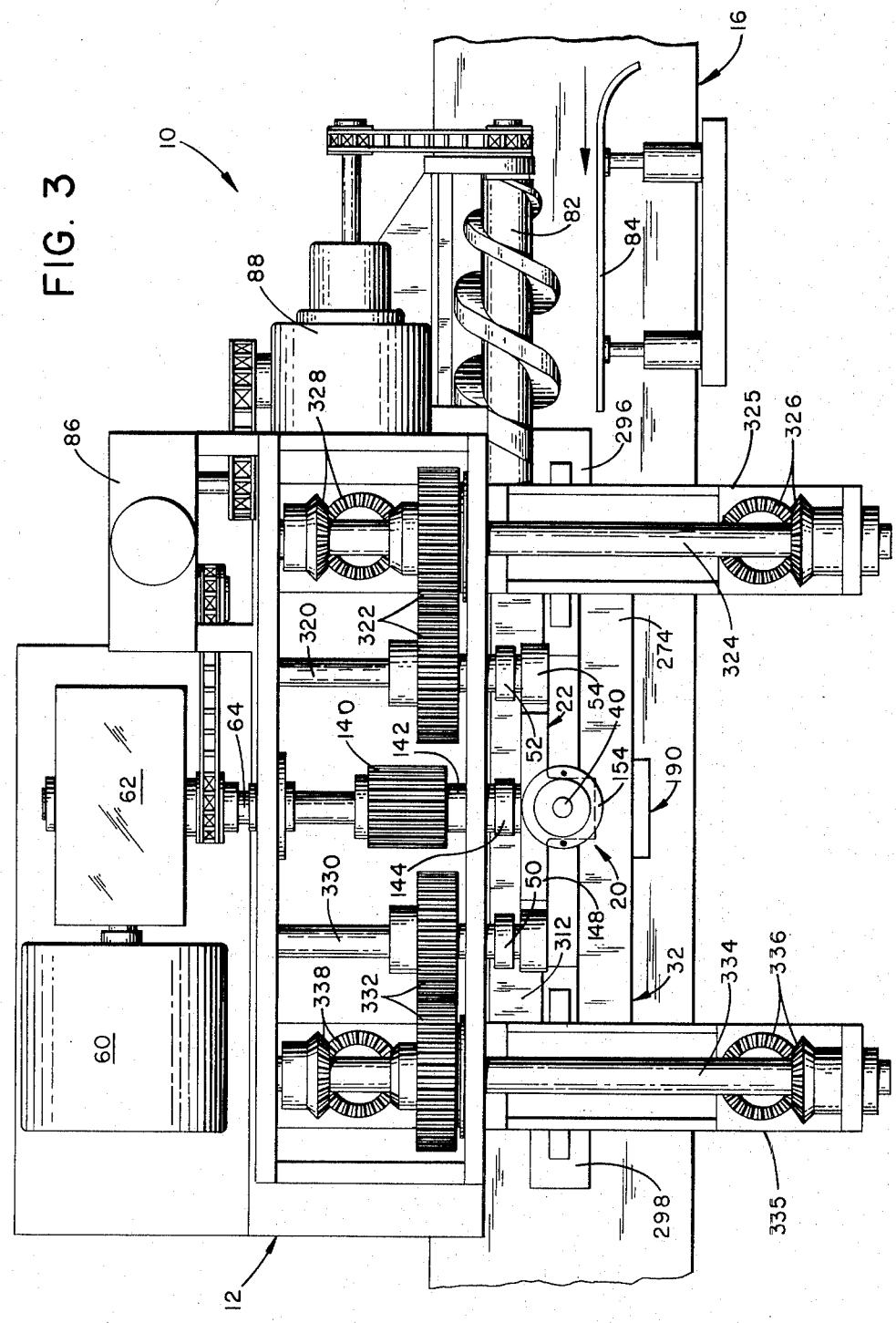
FIG. 3 is a top plan view of the embodiment of the apparatus of FIG. 1.

FIGS. 1, 2 and 3 show one embodiment of the apparatus of the present invention, generally designated 10. The apparatus 10 has a frame 12 that is mounted on jacks 14 for locating the apparatus in a level or upright operating position adjacent a conveyor 16 carrying a series of containers, specifically glass bottles B, at a uniform speed in the direction indicated by the arrows on the conveyor. While the apparatus 10, its component parts and the principles by which it operates have utility in several different environments, it is shown as an inspection apparatus for checking the critical dimensions of the glass bottles B moving along the conveyor 16.

The apparatus 10 includes a probe assembly 20 mounted on a parallel-crank, four-bar linkage 22 for movement in an orbital path which sweeps the probe assembly cyclically along the conveyor 16 in the direction of motion of the bottles B at the one portion of the orbit closest to the conveyor, and two additional parallel-crank, four-bar linkages 32 and 34 from which a body gauge 36 is suspeneded. The probe assembly 20 is provided with a plug or choke gauge 40 shown in detail in FIG. 5 and a finish-height gauge 42 which together with the body gauge 36 permit substantially all of the important dimensions of a bottle B to be checked simultaneously.

The probe assembly 20 is cyclically swept close to the conveyor 16 by the four-bar linkage 22 so that the gauges 40 and 42 are brought in contact with each of the bottles B moving in series at a constant speed along the conveyor. The four-bar linkage 22 which carries the probe assembly 20 in the horizontal direction back and forth along the conveyor comprises two parallel cranks 50 and 52 and an orbital link 54 suspended from each of the parallel cranks so that the link 54 orbits in a generally vertical plane and extends parallel to the horizontal motion of the bottles on the conveyor. A drive crank 56 having the same dimensions as the parallel cranks 50 and 52 is connected directly to the orbital link 54 for orbiting the link 54 in the vertical plane.

The drive crank 56 is rotated by a drive motor 60 (FIG. 3) connected to the crank by means of a transmission 62, drive shaft 64 and a variable ratio gear set comprising an elliptical drive gear 66 and an elliptical driven gear 68 mounted on the crank shaft 70 (FIG. 2). The drive crank 56 engages the orbital link 54 so that the modulated rotational speed provided by the elliptical gears 66 and 68 causes the crank 56 to rotate and the link 54 to orbit at a cyclically varying speed. As described in greater detail in the above-referenced copending application, the elliptical gears 66 and 68 are phased and connected to the crank 56 so that the orbital link 54 is swept at a slow speed close to the conveyor 16 at one portion of its orbit in the direction of motion of the bottles B and is returned at a high speed in the opposite direction at the upper portion of its orbit. The modulated speed provided by the elliptical gears 66 and 68 not only provides a rapid return motion but also causes the horizontal velocity of the orbiting link 54 at the lowest portion of its orbit adjacent the conveyor 16 to closely approximate the constant velocity of the bottles B.

Figure 4:
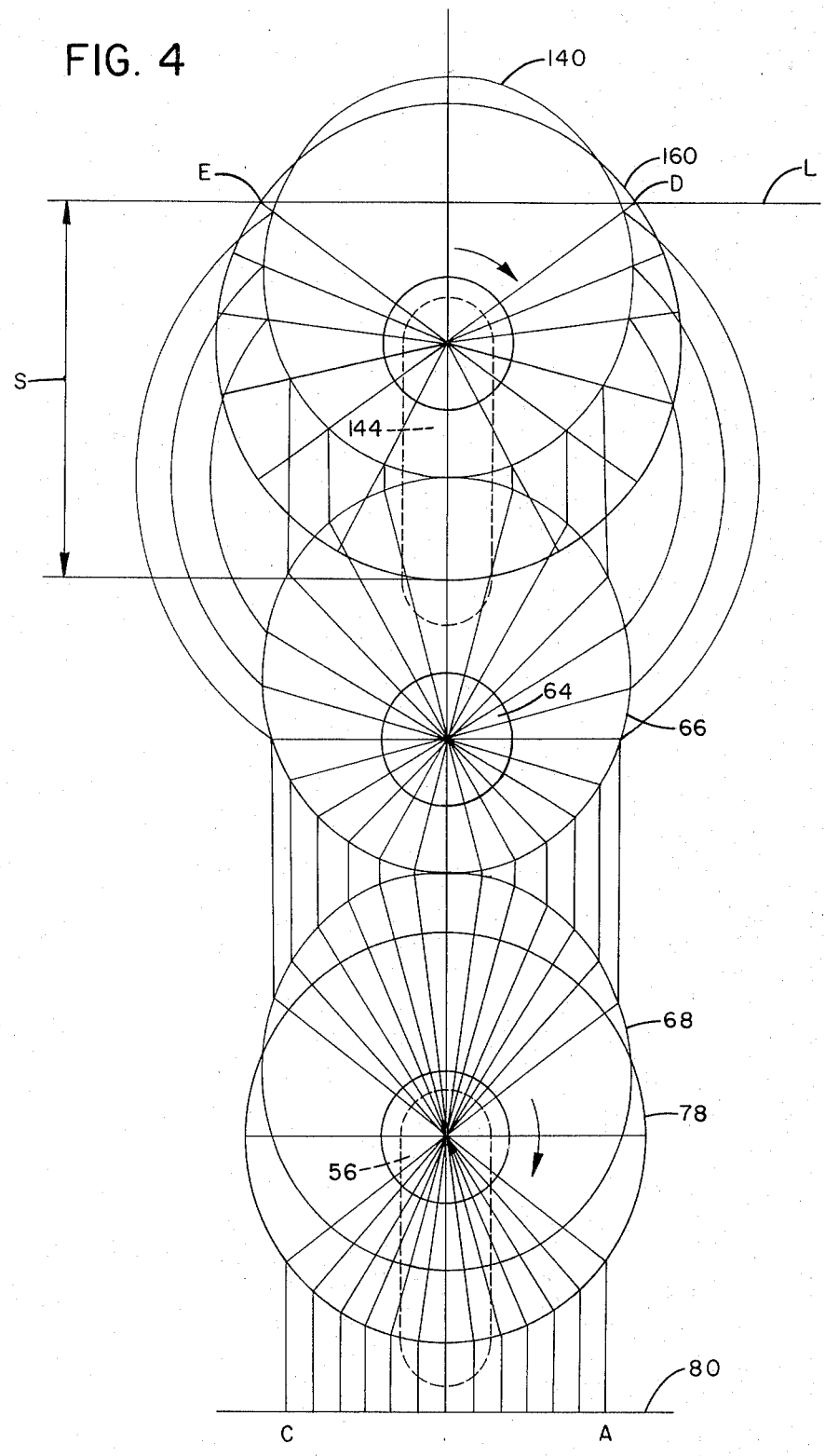
FIG. 4 is a diagrammatic layout of the elliptical gear sets providing the driving motions in the apparatus of FIG. 1.

FIG. 4 is a schematic diagram of the elliptical gears 66 and 68 and shows the kinematics of the orbital drive mechanism which produced the generally linear tracking motion along a segment of the conveyor 16. The interconnected graduations on the elliptical gears show the rotations of the gears and cranks for equal increments of time. The arc 78 represents the path of travel of the end of the crank 56 shown in phantom and the projections from the arc 78 onto the horizontal line 80 define substantially equal increments of displacement of the orbital link 54 and the probe assembly 20 in the hoizontal direction along the portion of the orbit closest to the conveyor 16. Since the motion of the bottle B on the conveyor is constant and since the horizontal tracking velocity of the orbital link 54 and the probe assembly 20 is substantially constant as indicated by the equal increments and as described in the copending application referenced above, the probe assembly 20 can be momentarily brought into tracking relationship with the moving bottle to perform the gauging operations with or without bodily contact. The line segment AC may be said to represent the tracking segment along the conveyor with point A representing the point of contact of the finish gauge 42 with the top of a bottle B and point C representing the point of departure or separation of the finish gauge 42 from the top of the bottle.

It is, however, necessary that the bottles B be positioned correctely along the moving conveyor 16 so that the bottles arrive at point A in FIG. 4 at the same time as the probe assembly 20. To this end, a feed worm 82 and a spring-loaded positioning bar 84 (FIG. 3) are located over the conveyor 16 at opposite sides of the line of travel of the bottles on the conveyor. The worm 82 is driven from the motor 60 through the transmission 62, a mechanical synchronizer 86, a 90° transmission 88 and the interconnecting drive chains. The mechanical synchronizer 86 permits the convolutions of the feed worm 82 to be phased relative to the drive train for the four-bar linkage 22 so that the bottles are correctly positioned and spaced on the conveyor to meet the probe assembly at point A shown in FIG. 4 during each orbit of the link 54.

Figure 5:
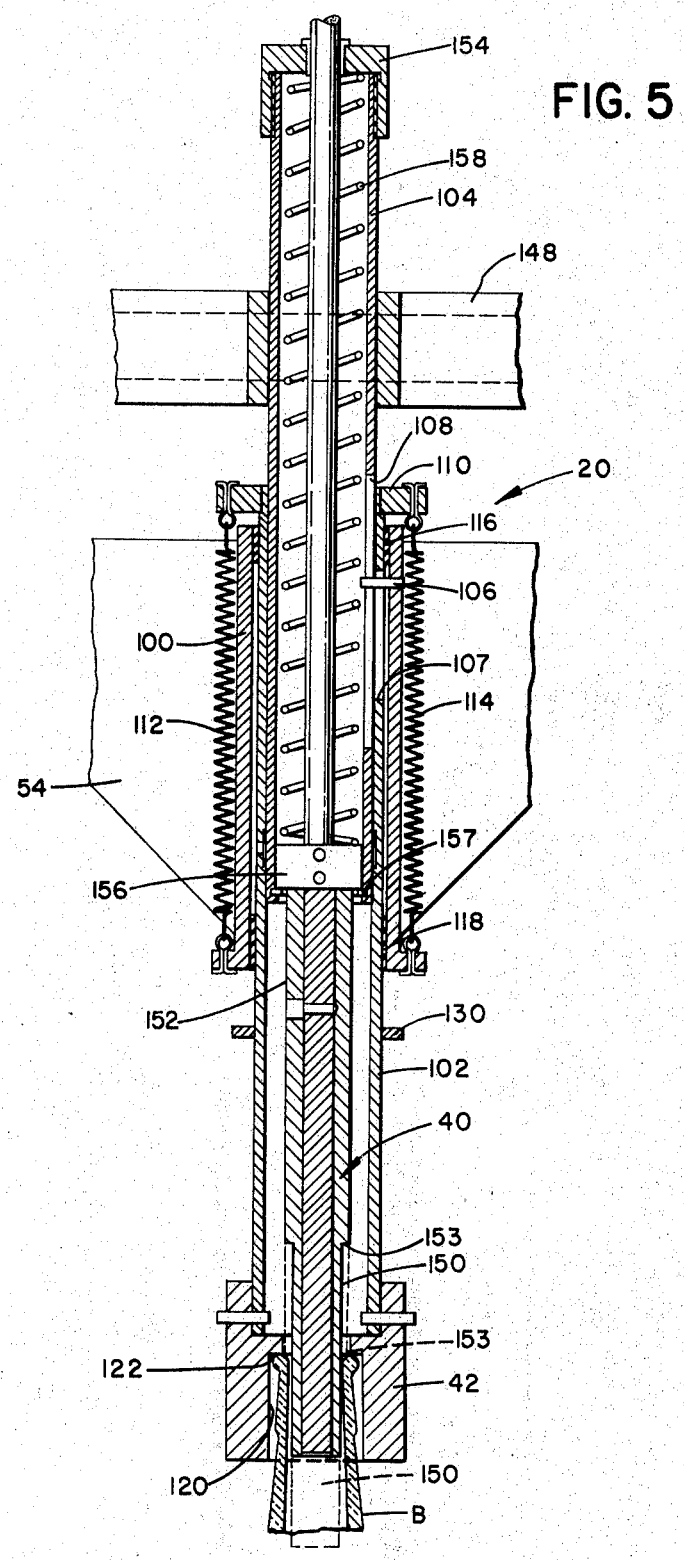
FIG. 5 is a fragmentary view of the apparatus showing the details of the probe assembly in cross section.

FIG. 5 shows the construction of the probe assembly 20 and its associated mounting and driving components in detail. It should first of all be noted that the said assembly is mounted in a housing 100 forming part of the orbital link 54 so that the assembly may slide vertically to a limited extent relative to the orbital link. The probe assembly 20 is comprised of two inspection probes, one of which includes a lower sleeve 102 and the attached finish-height gauge 42 and the other of which includes the upper sleeve 104 and the plug gauge 40 mounted coaxially within the lower sleeve. Both sleeves are coaxially mounted in the housing 100 and are prevented from rotating relative to the housing by a guide pin 106 fixed to the housing and projecting radially through vertical guide slots 107 and 108 in the sleeves 102 and 104 respectively. At its upper end, the sleeve 102 is fixedly connected to or integrally joined with a flange 110 which is biased downwardly toward a lower limit in contacting relationship with the housing 100 by means of two coil springs 112 and 114. Interposed between the housing 100 and the sleeve 102 are two bushings 116 and 118 which support the sleeve in a vertical position in sliding relationship with the housing 100. The resilient mounting provided for the probe assembly 20 by the springs 112 and 114 and the bushings 116 and 118 introduces the necessary compliance as the orbiting link 54 sweeps in an arc close to the conveyor 16 and the finish-height gauge 42 moves in a straight line after it makes contact with the finish of a bottle B on the conveyor.

It will be noted that the gauge 42 is pinned to the lower end of the sleeve 102 and has a gauge opening or bore 120. The opening 120 has an inside diameter which is equal in size to the largest tolerable diameter on the finish of the bottle. Furthermore, the shoulder 122 within the gauge 42 forms a step engaged by the bottle finish so that the downward displacement of the gauge is limited by the engagement of the shoulder and the top of the finish, and is indicative of the height of the bottle unless the diameter of the finish is less than the smallest tolerable diameter represented by the reduced diameter at the shoulder.

As shown most clearly in FIG. 2, a trip 130 fixedly secured to the sleeve 102 cooperates at the lowest point of its orbit with a flag 132 pivotally mounted on the frame 12 at the midpoint of the tracking segment and a microswitch (not shown) operated by the flag to indicate that the bottle B contacted by the gauge 42 is either accepted or rejected. As the sleeve 102 sweeps along the conveyor with the bottle B, the trip 130 will pass through a cutout 134 in the flag 132 provided that the finish of the bottle falls within the tolerances defined by the diameters of the opening 120 and that the height of the bottle above the conveyor falls within a specified range. If the finish diameter is out of tolerance and prevents the shoulder 122 of the gauge 42 from seating properly, or if the bottle is too short or too high, the sleeve 102 will be dislocated vertically and will cause the trip 130 to intercept the flag 132 at a point above or below the slot 134 as the trip reaches the lowest point of the orbit directly opposite the flag. The flag is then rotated and actuates the microswitch to indicate that the bottle falls outside of the predetermined dimensional tolerances. Sufficient compliance is provided by the springs 112 and 114 so that if a bottle having an excessively large finish or height prevents the gauge 42 from settling over the finish, neither the bottle nor the machine will be damaged. The gauge 42, therefore, safely provides a check on the maximum and minimum tolerable diameters of the finish of the bottle and also the maximum and minimum heights.

Figure 6:
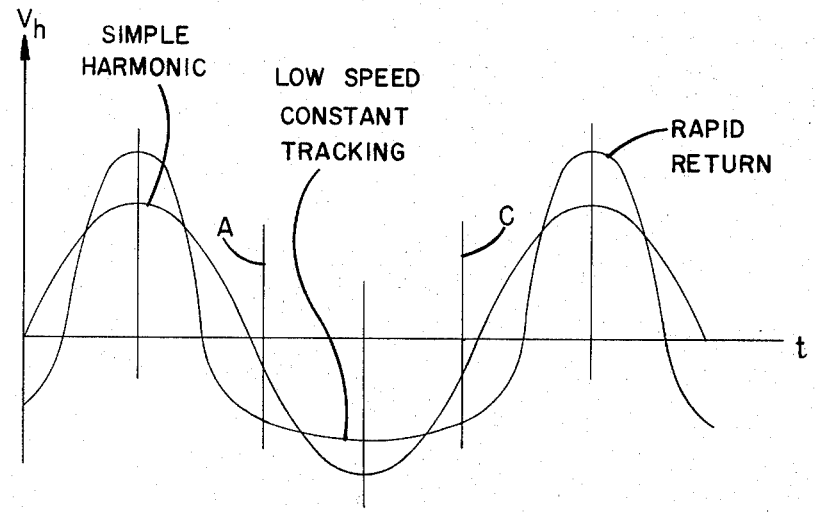
FIG. 6 is a graph showing the time variations of the horizontal tracking velocity of the probe assembly.

In FIG. 6 the horizontal velocity $V_h$ of the orbital link 54 is plotted with a simple harmonic velocity profile that would be observed if the gears 66 and 68 were conventional rather than elliptical gears. It is seen that the elliptical gears provide a more rapid return stroke than the conventional gearing and provide generally low speed, constant tracking velocities during the time interval in which the bottle moves along the tracking segment between point A and point C also shown in FIG. 4. Although the plug gauge 40 is also carried in the horizontal direction with the probe assembly 20 in the orbital link 54 so that the gauge 40 tracks the bottles B in the horizontal direction at the velocities shown in FIG. 6, the vertical motions of the inspection probe comprised of the upper sleeve 104 and the plug gauge 40 are controlled by a separate drive train. The said separate drive train operates in synchronism with the drive train of the orbital link 54 so that the sleeve 104 is reciprocated up and down relative to the bottles once during each orbit of the link 54. Thus, the plug gauge 40 is plunged downwardly into the opening in the finish of a bottle during the portion of the orbit in which the bottle is being accurately tracked between points A and C. More specifically, a second elliptical gear set including the driving gear 66 of the first elliptical gear set and another driven elliptical gear 140 (FIGS. 2, 3 and 4) mounted on a drive shaft 142 rotate a crank 144 with a modulated rotational speed. The crank 144 has a stud 146 at its outer end which engages a horizontal slot in a slide 148 fixed to the upper sleeve 104. As the crank 144 rotates at the modulated speed, the stud 146 displaces the sleeve 104 vertically relative to the lower sleeve 102 and the orbital link 54. Therefore, the horizontal reciprocations of the plug gauge 40 along the tracking segment A on the conveyor 16 are controlled by the orbital motions of the link 54 but the vertical reciprocations relative to the conveyor are independent of the link 54 and the finish gauge 42 and are controlled by a separate elliptical gear set.

The plug gauge 40 is mounted coaxially within the upper sleeve 104 and is comprised of an elongated rod having at its lower or gauging end a minimum diameter section 150 and a maximum diameter section 152 separated by a shoulder 153. The maximum diameter section 150 has an outside diameter corresponding to the minimum tolerable choke diameter of the bottle while the section 152 has an outside diameter corresponding to the maximum tolerable choke diameter. The plug gauge 40 extends through the lower ends of the sleeves 102 and 104 and through a cap 154 connected to the upper end of the sleeve 104 so that the gauge can slide axially relative to the sleeve 104. A flange 156 is connected fixedly to the gauge 40 near its midpoint and is urged downwardly onto a snap ring 157 by a biasing spring 158 captured between the flange 156 and the cap 154 at the top of the sleeve. The spring 158 provides sufficient compliance between the probe assembly 20 and the gauge 40 so that if the gauge 40 is unable to pass through the choke of a bottle which is undersized, damage to either the bottle or the machine is avoided. In such situation, the slide 148 continues to push the sleeve 104 downwardly; however, the plug gauge 40 slides axially within the sleeve 104 as the spring 158 compresses.

The graduations on the elliptical gear 140 in FIG. 4 and their projections onto the circle 160 define the rotational displacements of the crank 144 shown in phantom as it is driven at the modulated rotational speed of the elliptical gear set 66, 140. The cranks 56 and 144 are shown in the vertical positions assumed at the point in time when a bottle is located at the midpoint of the tracking segment AC. The phasing of the gears 66 and 140 differs by 180° from that of gears 66 and 68 so that the rotation of the crank 144 during the interval in which a bottle is tracked occurs at its highest speeds and the rotation of the crank 56 occurs at its lowest speeds. Also, because of the phasing and the separate drive trains producing the horizontal and vertical reciprocations of the plug gauge 40, the plug can enter the opening in the finish of a bottle on its down stroke while the crank 144 has a relatively low rotational speed near the upper portion of its rotation and also has a horizontal component of velocity having a sense opposite to that of the bottles moving on the conveyor. The point in the rotation of crank 144 at which the plug gauge can enter the bottle at the beginning of the tracking interval is shown by the graduations to be point D at the intersection of the circle 160 and the line L and the point at which the plug gauge then withdraws from the bottle is point E. With the high rotational speed of the crank 144 during the tracking interval, the plug gauge 40 reciprocates in and out of the bottle with a substantial stroke S indicated in the bottle in FIG. 4. For example, in one embodiment of the apparatus where the length of the cranks 50, 52 and 56 connected to the orbital link 54 is 1.462 inches and the crank 144 is 1 ¾ inches, the plug gauge 40 can be reciprocated to a depth of 2 ¾ inches below the finish of the bottle while the bottle is accurately tracked over a segment of the conveyor 2 ⅝ inches long. It should be noted as indicated in FIG. 4 that because of the rapid rotation of the driven gear 140, the stroke S of the plug gauge during the interval while generally constant tracking motion is produced by the gear 68 is greater than the radius of the crank 144. In other words, since the elliptical gear 140 is moving at high speed while the elliptical gear 68 is producing the tracking motion at low speed, the plug gauge 40 is reciprocated in and out of the bottle while the crank 144 rotates through more than 180°. The combination of the two elliptical gear sets, therefore, offers the significant advantages of substantially uniform tracking velocity in the horizontal direction and high speed probing of the inspected article during the same tracking interval.

Figure 7:
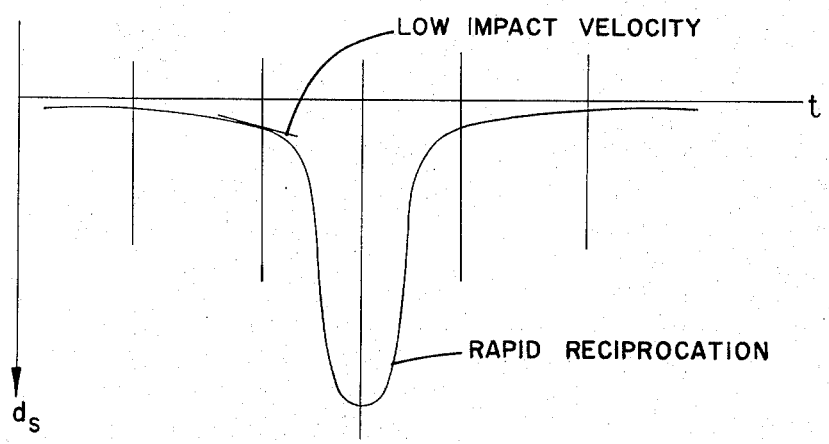
FIG. 7 is a graph showing the time variations of the plug gauge displacements.

FIG. 7 shows the time variations of the vertical displacement $d_s$ of sleeve 104 and in conjunction with FIG. 6 indicates that the probe section 150 enters the fill open of a bottle at a relatively low impact velocity indicated by the slope of the curve at the point corresponding to point A in FIG. 6. The relatively low impact velocity follows from the slow rotational speed of the driven gear 140 and the crank motion at the top of the stroke of the plug gauge. If the bottle is misaligned with the plug gauge, the low impact velocity reduces the likelihood of chipping the finish of the container or to upset the container. In the example given above in which the stroke S of the plug gauge in the bottle was 2 ¾ inches, an impact velocity of approximately 100 feet per minute is produced at an inspection rate of 200 bottles per minute. After the probe has entered the bottle, its vertical velocity increases substantially in order to reciprocate rapidly and deeply in and out of the bottle before the linear tracking motion of the orbital link 54 indicated in FIG. 6 ends. It will therefore be apparent that the modulated rotational speeds of the crank 144 produced by the elliptical gear set 66, 140 are phased with the gauging operation so that impact of the tip of the plug gauge occurs while the crank 140 is rotating at low speed and with a small vertical velocity component and that the probing of the plug gauge into the interior of the bottle occurs for the most part during the interval in which the crank 144 is rotating at high speed. The cooperative operation of the two elliptical gear sets, therefore, permits accurate tracking and deep probing of a bottle moving at constant speed along a conveyor.

As seen in FIG. 2, the upper end of the plug gauge 40 carries a tripping member 170 which at the lowest point in the rotation of crank 144 cooperates with a flag 172 pivotally mounted on the frame 12 of the apparatus 10 at the midpoint of the tracking segment. The flag 172 bears a rectangular cutout 174 which registers accurately with the tripping member 170 when the plug gauge has passed through the choke of a bottle to a point at which the shoulder 153 (phantom position in FIG. 5) rests against the finish of the bottle. If the plug gauge 40 does not penetrate to such depth, the trip member 170 pivots the flag 172 and actuates a microswitch (not shown) to indicate that the choke of the bottle is too small. If the larger diameter section 152 also enters the opening of a bottle at the lower end of the stroke, the trip member 170 drops below the cutout 174 and also pivots the flag to indicate that the opening is too large. In other words, any time the flag 172 is pivoted, a signal from the microswitch will indicate that the opening in the bottle is either too large or too small but without discriminating between these out-of-tolerance conditions. It will also be noted that the shoulder 153 on the plug gauge may provide a height check in the same manner as the shoulder 122 in the finish gauge 42. The phantom position of the tripping member 170 shown in FIG. 2 indicates that the member at its uppermost position clears the flag 172 as the orbital link 54 returns the probe assembly 20 past the midpoint of the tracking segment in preparation for a subsequent operation.

While the plug gauge 40 and the finish gauge 42 are reciprocated cyclically onto successive bottles, the body gauge 36 simultaneously and cyclically checks the outside diameters of the bottle bodies. The gauge 36 includes two ring gauges 180 and 182, each of which is composed of two opposed, article-engaging jaws mounted respectively to the parallel-crank four-bar linkages 32 and 34. The ring gauges 180 and 182 have the same constructions and differ only in that they are mounted from the four-bar linkages 32 and 34 at different elevations above the moving surface of the conveyor 16 to permit the gauges to measure the outside body diameter of a bottle at two different locations. The number of ring gauges can be increased or decreased depending upon the extent to which the body diameter is to be checked. Since the ring gauge 182 is identical to the gauge 180, only the details of the gauge 180 are described below.

With reference to FIGS. 2 and 8, the bottle engaging jaws 190 and 192 are formed by two bifurcated members 194 and 196 defining opposed, inwardly facing and cooperating recesses 198 and 200 in which the body of a bottle B can be received with ample clearance. Sandwiched between the furcations of the members 194 and 196 are deflectible tripping members 202 and 204 respectively which also bear opposed recesses 206 and 208. The recesses 206 and 208 have a curvature corresponding substantially to the body of a bottle having the maximum tolerable diameter while the recesses 198 and 200 would accommodate a substantially larger bottle. In practice, the recesses 206 and 208 will accommodate bottles having body diameters equal to or less than the maximum tolerable diameter and the recesses 198 and 200 are selected to be large enough to accommodate the largest oversized bottle that would be expected to pass through the body gauge 36 without causing damage to the equipment or surrounding bottles.

The bifurcated member 194 is suspended from the parallel-crank, four-bar linkage 32 by means of two parallel posts 210 and 212. The member 194 is fixedly attached to the post 210 in a generally horizontal position with the recess 198 facing inwardly toward the vertical plane of the conveyor 16 along which the bottles B move. The trip member 202 contains two generally egg-shaped apertures 214 and 216 which register respectively with the posts 210 and 212 so that the trip member can slide in the horizontal direction between the opposed surfaces of the bifurcations of the member 194 within limits defined by the apertures 214 and 216. When the posts 210 and 212 are engaged by the more narrow ends of the egg-shaped apertures 214 and 216, the recess 206 on the inwardly projecting end of the trip member 202 is positioned generally concentrically with the recess of the bifurcated member 194. A biasing spring 220 connected to two anchor pins 222 and 224 in the bifurcated member 194 stretches over the outer peripheral end of the trip member 202 so that the spring urges the member 202 inwardly relative to the member 194 toward the bottles on the conveyor.

The bifurcated member 196 is suspended from the parallel crank, four-bar linkage 34 by means of two posts 230 and 232 in a manner similar to the bifurcated member 194. The trip member 204 contains two egg-shaped apertures 234 and 236 which respectively register with the posts 230 and 232 to capture the trip member 204 between the opposed surfaces of the bifurcations of the member 196. A biasing spring 240 is stretched over the outer edge of the trip member 204 and is fastened by the anchor pins 242 and 244 to the member 196 so that the trip member 204 is urged inwardly relative to the member 196 toward the center of the conveyor 16 and the opposing trip member 202 at the opposite side of the conveyor.

It will be readily understood that if an oversized bottle is received within the jaws 190 and 192, one or both of the tripping members 202 and 204 will be displaced outwardly toward the lateral edges of the conveyor in opposition to the biasing forces of springs 220 and 240. In order to detect the displacement of the tripping members 202 and 204, two magnetically operated swtiches 250 and 252 are mounted respectively on the jaws 190 and 192 and are actuated by armatures 254 and 256 connected respectively to the trip members 202 and 204 and projecting upwardly through cutouts 258 and 260 in the bifurcated members 194 and 196 respectively. The use of two switches 250 and 252 insures that an oversized bottle will be detected regardless of which of the tripping members is moved. Since the ring gauges 182 has the same construction as the ring gauge 180, corresponding switches 262 and 264 are actuated in the same manner.

It will be understood that in order to bring the ring gauges 180 and 182 into embracing relationship with the moving bottles to check the body dimensions at the same time as the gauging operation of the plug gauge 40 and finish gauge 42, it is necessary to close the ring gauges from opposite sides of the conveyor about a bottle at the central plane of the conveyor along which the bottles are positioned by the feed worm 82 and bar 84 and to move the ring gauges in a tracking motion with the bottles in much the same manner as the probe assembly 20 is moved horizontally along the tracking segment of the conveyor. The four-bar linkages 32 and 34 accomplish the closing and tracking motions along the tracking segment and operate in generally the same manner as the four-bar linkage 22 except that the orbital motions of the linkages lie in a horizontal plane and, therefore, the ring gauges 180 and 182 are swept into engaging relationship with the bottles from opposite sides of the conveyor and track the bottle at substantially constant speed over the same tracking segment as that followed by the plug gauge 40 and the finish gauge 42.

The four-bar linkage 32 is comprised of two parallel-cranks 270 and 272 as seen in FIGS. 1 and 2 and an orbital link 274 from which the support posts 210 and 212 depend. The orbital link 274 is connected resiliently to the ends of the cranks 270 and 272 by means of two slide rods 276 and 278, two pivotal slide bushings 288 and 290 and two coil springs 292 (only one visible) respectively. The resilient connection between the cranks 270 and 272 and the orbital link 274 allows the orbital link to depart from the circular orbits of the cranks and to follow an orbital path that is not perfectly circular but somewhat flattened at the portion overlying the conveyor 16 so that the jaws of the engaging rings 180 and 182 close symmetrically into embracing relationship with the bottles at the center plane along which the bottles B move. Two T-shaped guide tracks 296 and 298 are suspended from the frame 12 and are contacted by sets of guide rollers 300 (only one set shown) at each end of the orbital link 274 to provide vertical and horizontal alignment for the orbital link as the gauging rings 180 and 182 close on the bottles.

The four-bar linkage 34 is constructed in the same manner as the linkage 32 and has its component parts mounted in opposed relationship to the corresponding parts of the linkage 32. The four-bar linkage 34 includes two parallel cranks 310 (only one visible) and the orbital link 312 which is resiliently suspended from the cranks by means of two slide rods 314 (one visible), two pivotal bushings 316 (one visible) mounted to the ends of the cranks 310 and two biasing springs 318 (one visible) interposed between the orbital link 312 and the bushings 316 to urge the link inwardly toward the central plane along which the bottles B travel. Two sets of guide rollers 319 (one set not visible) are mounted on the opposite ends of the oribital link 312 and engage respectively the T-shaped tracks 296 and 298 to guide the jaws of the ring gauges suspended from the orbital link 312 as they are brought into embracing relationship with the bottles.

Since the orbital tracking motions of the links 274 and 312 of the linkages 32 and 34 must be synchronized with the orbital motions of the link 54, the driving motions of the cranks 270, 272 and 310 are derived from the parallel cranks 50 and 52 of the four-bar linkage 22. As seen in FIGS. 2 and 3, the crank 52 is keyed to a drive shaft 320 and is connected in driving relationship through a conventional gear set 322 to a drive shaft 324. The drive shaft 324 at one end mounted in a cantilevered beam 325 on the frame 12 (partially broken away in FIG. 2) rotates the crank 270 of the four-bar linkage 32 through a beveled gear set 326 and drives one of the cranks 310 of the four-bar linkage 34 through another beveled gear set 328 at the opposite end. In a similar manner, the crank 50 of the four-bar linkage 22 is keyed to a drive shaft 330 and is connected through a conventional gear set 332 to the drive shaft 334. Bevel gear set 336 at the one end of the drive shaft 334 mounted in a cantilever beam 335 drives the crank 272 of the four-bar linkage 32 while the bevel gear set 338 drives the other of the parallel cranks 310 of the four-bar linkage 34. Since the rotational motions of the cranks 50 and 52 are modulated by the elliptical gear set 66, 68 to produce substantially linear tracking motions, and since the modulated rotational speeds of the cranks 50 and 52 are transmitted directly to the parallel cranks 270, 272 and 310 of the four-bar linkages 32 and 34, the orbital links 274 and 312 execute the same horizontal tracking motions as the orbiting link 54 and the ring gauges 180 and 182 track the bottles along the tracking segment AC shown in FIG. 4. For a further description of the tracking motions generated by the four-bar linkages 32 and 34, reference may be had to the corresponding description of these linkages found in the copending patent application referenced above.

It will be understood that by employing two separate sets of ring gauges and bringing such gauges into embracing relationship with a bottle B at different elevations above the conveyor 16, not only will oversize bottles furnish a signal from the magnetic switches 250 and 252, but also a distorted bottle having a "banana" shape with the opening penetrated by the plug gauge at the top of the bottle coaxially aligned with the bottom of the bottle will be detected. The ring gauges may also detect "leaners" or bottles having non-concentric tops and bottoms. Leaners may also be detected by the apparatus 10 through the plug gauge 40 and finish gauge 42 since it is most likely that the gauges 40 and 42 will not register accurately with the finish of the bottle and will, accordingly, cause one or both of the flags 132 or 172 to be tripped.

The plug gauge 40 and the finish gauge 42 furnish critical information concerning the dimensions at the full opening of the bottle and, together with the information provided by the body gauge 36, complete the inspection of the more critical dimensions of a bottle. All of the dimensions are checked simultaneously as the bottle is tracked along a short segment of the conveyor and without interfering with the continuous movement of the bottle under inspection or adjacent bottles upstream and downstream of the tracking segment along the conveyor. Any one of the signals produced by the switches 250, 252 or the microswitches actuated by the flags 132 and 172 may be used to actuate a pneumatically operated piston and cylinder assembly of an ejector mechanism 350 (FIG. 1) as the dimensionally inaccurate bottle moves past the apparatus after the inspecting operation.

While the present invention has been described in a preferred embodiment, it will be understood that numerous modifications and substitutions can be had to the individual components of the apparatus without departing from the spirit of the invention. For example, the plug gauge 40 and the finish-height gauge 42 can be used separately or in the combination shown. Furthermore, the body gauge 36 may be operated by itself or in combination with either one of the gauges 40 and 42 and the gauges 40 and 42 can be operated without the body gauge 36 by substitution of other more conventional bottle centering devices such as a spacer worm. Also, while the gear sets have been described as elliptical gear sets, eccentric gear sets also have cyclically varying gear ratios and with sliding block or spring loaded drive members will produce similar velocity profiles. The flags 132 and 172 can be replaced by other signalling devices and the magnetic switches 250 and 252 can also be replaced by equivalent electrical or mechanical indicators. Of course, the tolerances accommodated by the flags and switches may be varied according to the type of bottle or other container being inspected. The flags may be easily changed where different tolerances are allowed without affecting the signalling devices which detect movements of the flags when a non-conforming bottle is detected. Accordingly, the present invention has been described in a preferred embodiment by way of illustration rather than limitation.

What is claimed is:

1. Apparatus for tracking and probing an article moving on a conveyor at a constant speed comprising: a frame having an upright operating position adjacent a conveyor on which articles move at constant speed; carrier means mounted on the frame and movable relative to the frame in at least a first coordinate direction extending parallel to the direction of movement of the articles on the conveyor at the operating position of the frame; a probe assembly having a movable probe with a probe axis, means supporting the probe assembly on the carrier means for movement of the probe along the probe axis relative to the carrier means in a second coordinate direction perpendicular to the first coordinate direction and the direction of movement of the articles at the operating position of the frame adjacent the conveyor whereby the probe mounted on the carrier means may move relative to the carrier means toward and away the articles in the second coordinate direction and move in the first coordinate direction with the carrier means parallel to the movement of the articles on the conveyor; first drive means including a first variable ratio gear set for cyclically reciprocating the carrier means and the probe assembly in the first coordinate direction at a speed modulated by the gear set; and second drive means including a second variable ratio gear set for cyclically reciprocating the probe in the second coordinate direction at a speed modulated by the gear set.

2. Apparatus for tracking and probing as defined in claim 1 wherein: the first drive means and the second drive means are interconnected to synchronize the reciprocating motions of the probe in the first and second coordinate directions.

3. Apparatus for tracking and probing as defined in claim 2 wherein: the variable ratio gear set included in the first drive means comprises a set of intermeshing elliptical gears having a driving gear and a driven gear; and the variable ratio gear set included in the second drive means comprises a set of intermeshing elliptical gears having one driving gear and one driven gear.

4. Apparatus for tracking and probing as defined in claim 3 wherein the driving gear of the first drive means is the same as the driving gear of the second drive means.

5. Apparatus for tracking and probing as defined in claim 3 wherein the sets of elliptical gears are interconnected in a phase relationship in which the speed variations of the driven gear in the first drive means are 180° out of phase with the speed variations of the driven gear in the second drive means.

6. Apparatus for tracking and probing as defined in claim 1 wherein: the carrier means comprises a parallel-crank, four-bar linkage having an oribital link supported from the frame parallel to the first coordinate direction by the two parallel cranks in the operating position of the frame; and wherein the support means mounts the probe assembly on the orbital link for reciprocation of the movable probe relative to the orbital link in the second coordinate direction.

7. Apparatus for tracking and probing as defined in claim 6 wherein: the first drive means includes a drive crank connected to the orbital link of the four-bar linkage, the drive crank being connected with and driven by the variable ratio gear set for orbiting the link and the probe assembly at a modulated speed.

8. Apparatus for tracking and probing as defined in claim 6 wherein: the second drive means includes a drive crank connected in driving relationship with the variable ratio gear set for driving the crank at a modulated rotational speed, and a cross slide connected to the probe and slidably engaged with the drive crank for transmitting the driving motions of the crank to the probe in the assembly mounted to the orbital link.

9. Apparatus for tracking and probing as defined in claim 6 wherein: the first drive means includes a first crank driven by the first variable ratio gear set and connected to the orbital link of the parallel-crank, four-bar linkage; the second drive means includes a second crank driven by the second variable ratio gear set and connected in driving relationship to the probe supported in the assembly on the orbital link; and the first and second variable ratio gear sets are interconnected and have a fixed phase relationship whereby the reciprocations of the probe in the first and second directions are synchronized and fixed in phase relationship.

10. Apparatus for tracking and probing as defined in claim 9 wherein: the first and second variable ratio gear sets of the first and the second drive means are elliptical gear sets having a common drive gear and two driven gears meshing with the common drive gear with 180° phasing.

11. Apparatus for inspecting containers carried on a conveyor moving at a constant speed comprising: a support frame; a parallel-crank, four-bar linkage having an orbital link and two parallel cranks and mounted on the support frame at a position permitting the orbital link to be located parallel to the conveyor and permitting the cranks to sweep the orbital link close to the conveyor at one portion of the orbit of the link, a first inspection probe mounted in perpendicular relationship to the conveyor and on the orbital link and slidably engaged with the orbital link for movement relative to the link toward and away from the articles on the conveyor at the one portion of the orbit; first rotational drive means connected to the four-bar linkage for sweeping the orbital link cyclically through a full orbit and in the direction of the conveyor motion at the one portion of the orbit; and second rotational drive means connected to the inspection probe for cyclically reciprocating the inspection probe relative to the orbital link toward and away from the articles.

12. Apparatus for inspecting as defined in claim 11 wherein: the first rotational drive means includes a drive motor and a first gear set connected between the motor and the four-bar linkage; and the second rotational drive means includes a second gear set connected between said motor and the inspection probe, the second gear set having a cyclically varying gear ratio and being phased with the first gear set to provide a more rapid driving speed for reciprocating the probe relative to the orbital link as the link sweeps close to the conveyor at the one portion of the orbit.

13. Apparatus for inspecting as defined in claim 12 wherein: the first gear set of the first rotational drive means has a cyclically varying gear ratio and is phased with the second gear set to provide a reduced driving speed for the orbital link as the link sweeps close to the conveyor at the one portion of the orbit.

14. Apparatus for inspecting as defined in claim 13 wherein: the first and second gear sets are elliptical gear sets comprised of a common driving gear and two driven gears meshing respectively with the common drive gear.

15. Apparatus for inspecting as defined in claim 11 wherein: a second inspection probe is mounted in perpendicular relationship to the conveyor and on the orbital link coaxially about the first inspection probe, the second probe being secured to the orbital link for sweeping movement toward and away from the articles on the conveyor as the link is orbited.

16. Apparatus for inspecting as defined in claim 15 wherein: the second inspection probe is mounted perpendicularly in sliding engagement with the orbital link and the first inspection probe, and includes a limit stop engaged by the orbital link and defining the displacement limit of the second probe relative to the orbital link toward the articles on the conveyor; and a retaining spring is connected between the second inspection probe and the orbital link to hold the limit stop releasably engaged with the orbital link.

17. Apparatus as defined in claim 15 for inspecting articles in the form of containers having fill openings and finishes wherein: the first inspection probe comprises a choke gauge having a plug of preselected size for gauging fill openings in the containers on the conveyor; and the second insepection probe comprises a finish-height gauge having a bore of preselected dimensions for gauging the finishes and heights of the containers.

18. Apparatus for inspecting as defined in claim 17 further including: first signaling means mounted to the frame and cooperating with the choke gauge to indicate a malformed article; and second signaling means mounted to the frame and cooperating with the finish and height gauge to indicate a malformed article.

19. Apparatus as defined in claim 11 for inspecting articles in the form of bottles moving on the conveyor in spaced relationship wherein: three parallel-crank, four-bar linkages are mounted on the support frame at positions permitting the three orbital links to orbit parallel to the conveyor and permitting the cranks to sweep the orbital links close to the conveyor at one portion of the orbit of each link, the first of the four-bar linkages bearing the first inspection probe and being mounted on the frame to lie above the conveyor with a vertically oriented orbital plane and the second and third of the four-bar linkages being mounted on the frame to lie respectively at each side of the conveyor with horizontally oriented orbital planes; drive transmitting means connect the first rotational drive means to the second and third four-bar linkages for orbiting the orbital links of the first, second and third four-bar linkages simultaneously in phase with each other close to the conveyor and in the direction of the conveyor motion; and a set of two opposed, bottle-engaging jaws are mounted respectively to the orbital links of the second and third four-bar linkages and are suspended from the links to embrace the bottles as the links sweep close to the conveyor.

20. Apparatus for inspecting as defined in claim 19 wherein a spring-loaded deflection member is mounted on one of the bottle-engaging jaws at a portion embracing a bottle; and signal means are also mounted to the one of the jaws on which the deflection member is mounted and is connected in operating relationship with the deflection member to provide a signal in the event that the spring-loaded deflection member is moved a predetermined amount by an embraced bottle.

21. Apparatus for inspection as defined in claim 19 further including positioning means connected with the frame at a position to be located above the conveyor and also connected in driving relationship to the first rotational drive means for positioning the bottles on the conveyor in phased relationship with the orbital motions of the links in the four-bar linkages.

22. Apparatus for gauging the bodies of articles while the articles are transported at uniform speed on a conveyor comprising: a gauging ring including two opposed, article-engaging jaws having mating recesses forming a body opening corresponding with the body shape of the articles whereby an article can be at least partially embraced within the recesses of the opposed jaws, and also including a deflectible tripping member extending toward the center of the gauging ring from the edge of a recess in at least one of the jaws and engaged by an embraced article; signalling means mounted on the one of the opposed jaws having the tripping member and operatively connected with the tripping member for detecting a preselected movement of the deflectible member caused by an oversized body; and tracking means connecting with the opposed jaws for closing and moving the opposed jaws in embracing relationship about the body of an article as the article moves at the uniform speed along a segment of the conveyor.

23. Apparatus for gauging the bodies of articles as defined in claim 22 wherein: the tracking means comprises a four-bar linkage having two parallel cranks mounted for rotation in a plane parallel to the surface of the conveyor over which the articles move at the one segment of the conveyor, and an orbital link mounted between the cranks parallel to the movement of the transported articles on the segment of the conveyor, and further includes driving means connected to the four-bar linkage and having a drive motor and a variable ratio gear set connected between the drive motor and the four-bar linkage for orbiting the link at a modulated orbital speed; and wherein one of the two opposed article-engaging jaws is mounted to the orbital link.

24. Apparatus for gauging as defined in claim 23 wherein the variable ratio gear set of the driving means is an elliptical gear set.

25. Apparatus for gauging the bodies of articles as defined in claim 23 wherein: a set of two slide bushings pivotally connected respectively to the two parallel cranks and two slide rods engaged respectively in the two bushings and fixedly connected to the orbital link are provided to mount the orbital link to the cranks; and resilient means are interposed between the orbital link and the cranks to permit the orbit of the link to depart from the circular orbits of the cranks as the opposed jaws engage the body of an article.

26. Apparatus for gauging articles as defined in claim 22 wherein: the opposed jaw having the deflectible tripping member is provided with surfaces guiding the movement of the member relative to the recess, and resilient means are connected with the jaw and the member for biasing the member toward the recess.

27. Apparatus for gauging articles as defined in claim 26 wherein: two parallel posts are connected to the opposed jaw having the deflectible tripping member and the deflectible member contains two apertures which register respectively with the parallel posts for mounting the member with limited sliding movement on the jaw.

28. Apparatus for gauging articles as defined in claim 22 wherein each of the two article-engaging jaws has a deflectible member; and the signaling means comprises two switches operatively connected respectively to the deflectible members and corresponding jaws for actuation by the relative movements of the respective deflectible members and corresponding jaws.

29. Apparatus for gauging the bodies of articles as defined in claim 22 wherein: the tracking means comprises two orbiting members disposed respectively at opposite lateral sides of the conveyor and driven in orbital paths in synchronism to simultaneously sweep close to the conveyor along portions of the orbital paths from the respective lateral sides and along the segment of the conveyor in the direction of movement of the articles on the conveyor; and the two opposed jaws are mounted respectively to the two orbiting members for orbital movement with the members into embracing relationship with the body of an article along the segment of the conveyor.

* * * * *